United States Patent [19]
Brown et al.

[11] 3,811,057
[45] May 14, 1974

[54] NONEQUILIBRIUM MAGNETOHYDRODYNAMIC DEVICE

[75] Inventors: Robert T. Brown, Manchester; Robert H. Bullis, Avon; Thomas L. Churchill, Glastonbury, all of Conn.; Robert J. Hall, Cambridge, England; Edmund C. Lary, Glastonbury, Conn.; William L. Nighan, III, Manchester, Conn.; Elliot R. Schulman, West Hartford, Conn.

[73] Assignee: United Aircraft Corporation, East Hartford, Conn.

[22] Filed: Dec. 29, 1971

[21] Appl. No.: 213,374

[52] U.S. Cl. .................................. 310/11
[51] Int. Cl. .......................... H02k 45/00
[58] Field of Search ........................ 310/11

[56] References Cited
UNITED STATES PATENTS

| 3,524,086 | 8/1970 | Lindley | 310/11 |
| 3,268,746 | 8/1966 | Crown et al. | 310/11 |

Primary Examiner—D. F. Duggan
Attorney, Agent, or Firm—Anthony J. Crisco

[57] ABSTRACT

A nonequilibrium magnetohydrodynamic system in which the working fluid is subjected to a magnetic field over the entire distance between the throat of the expansion nozzle and the exit plane of the generator region of the device is disclosed; the system is operable without an external power source otherwise necessary for auxiliary ionization of the working medium. Also disclosed are the flow velocity, magnetic field intensity, pressure and temperature parameters which must be satisfied to produce the operational conditions.

4 Claims, 2 Drawing Figures

PATENTED MAY 14 1974 3,811,057

NONEQUILIBRIUM MAGNETOHYDRODYNAMIC DEVICE

BACKGROUND OF THE INVENTION

The invention herein described was made in the course of or under a contract or subcontract thereunder, with the Department of the Navy.

1. Field of the Invention

This invention relates to magnetohydrodynamic systems and more particularly to nonequilibrium magnetohydrodynamic systems having no external source of auxiliary ionization.

2. Description of the Prior Art

In conventional electrical power generation systems which use rotating machinery, a solid conductor in the form of a wire is driven across a magnetic field thereby inducing an electric current in the conductor; this current is collected and passed through an external circuit to do useful work. There is a direct analogy in power generation based on magnetohydrodynamic (MHD) principles; in the analogy, the solid conductor is replaced by an electrically conducting fluid, usually a gas, and more specifically a plasma. There is a continuous technical effort to improve the characteristics of such plasmas to have them correspond more closely to the overall theoretically attainable magnetohydrodynamic limits.

The elements of a simplified MHD generator include a source of energy, an expansion nozzle, a magnetic field region and a working fluid. During the operation of such a system, energy is added to the working fluid which in turn is expanded to a high velocity. The fluid is then flowed through the magnetic field region and the fluid-magnetic field interaction produces an electric current that flows essentially perpendicularly to the field, the velocity of the fluid being reduced in the process. Successful operation of such a system requires that the electrical conductivity of the fluid be high enough to produce a large magnetohydrodynamic interaction in a device that is not unrealistically lengthy; a low electrical conductivity gas (one which is poorly ionized) is impractical because it requires a long generator section and the fluid frictional loss effects become too great.

Existing nonequilibrium MHD devices which rely on these concepts to convert kinetic energy into electrical energy have in the past utilized external sources of energy for proper ionization of the working fluid prior to its entry into the generator section. Briefly, these ionizing sources have taken the forms of beams of high energy particles, fission fragments, photoionization, and electric discharges. Each of these methods of providing auxiliary ionization or preionization (two terms which are used somewhat interchangeably in the art) has its particular shortcomings, and until a simple and effective method of providing a working medium with the proper conductivity is discovered, nonequilibrium magnetohydrodynamic power generation will not realize its full potential.

The most effective method of preionization to date has relied on electric discharge means which present substantial operational difficulties. A nonequilibrium MHD system invariably requires a gas flow at high velocity, often in the range of Mach 2–5, the maintenance of an electric discharge of any nature in a gas flowing supersonically is difficult enough, and to predict or control the inevitable nonuniformities in an electric discharge at supersonic velocity complicates the problem further. Unstable discharge conditions lead to small scale, and in some cases large scale, arcing between the electrodes, a condition which is intolerable for good MHD power generation because of the disruptions such nonuniformities cause in the principal power generator region of the device. The plasma nonuniformity has limited the achievement of practical MHD systems.

Another practical drawback to the electric discharge technique for providing auxiliary ionization, is the amount of electrical power which such a system often consumes; this power can be relatively large in amount (as high as 10's of kilowatts) and must meet additional requirements such as being transportable to the site of the MHD device; it must also be conditioned to meet the operational parameters of the system. A further practical problem inherent in electric discharge auxiliary ionization, is the interaction which occurs between the high intensity magnetic field and electric discharge per se. A very uniform plasma distribution in the generation region of the device is the desired condition, and any mechanism which tends to distort an otherwise uniform flow pattern is undesirable; distortion is, however, inevitable whenever a high intensity electric discharge and an intense magnetic field are allowed to interact. For example, if the discharge is set up with the discharge current being parallel to the direction of gas flow and transverse to the direction of the magnetic field, the current and the field interact in an unstable manner and often result in the discharge being pinned to one side of the flow channel. If the discharge is maintained parallel to the direction of the magnetic field and transverse to the direction of gas flow, the discharge is blown downstream and extinguished.

SUMMARY OF THE INVENTION

An object of the present invention is to provide a stream of flowing fluid containing a uniform plasma having a self-induced electrical conductivity which is sufficient to ensure efficient nonequilibrium magnetohydrodynamic interaction with a magnetic field in a flow path of reasonable length and exclusive of any external source of auxiliary ionization.

Another object of the present invention is to enhance the conductivity of the working medium of a magnetohydrodynamic device before the medium enters the generator section of the device.

The present invention is predicated on recognizing that the electrical conductivity typical of a thermally energized working fluid in a seeded nonequilibrium magnetohydrodynamic device is sufficient for adequate electromagnetic interaction provided this level of conductivity is maintained substantially undiminished until the working medium reaches the main generative portion of the device. Since electron-ion recombination occurs very rapidly during the fluid expansion, it was throught previously that the required electrical conductivity could not be maintained at an acceptable level throughout expansion until reaching the entrance to the MHD generator section. For this reason, auxiliary ionization means were invariably thought to be necessary. However, we have found that a working fluid can be expanded across an aerodynamically conventional supersonic nozzle and then passed through the generator section without any substantial overall reduction in the electron temperature and in turn the electrical conductivity, whereas previously the electrical conductivity of the working fluid was reduced substantially during such an expansion. Since the electrical conductivity of the working medium is above the critical threshold after the expansion process, a thermally self-induced (bootstrapping) ionization is possible and the electrical conductivity at the main generator portion of the device is sufficient to ensure effective nonequilibrium magnetohydrodynamic interaction.

According to the present invention, a nonequilibrium magnetohydrodynamic device having a magnetic field region throughout the region between the throat of the expansion nozzle and the exit from the MHD generative section generates, under prescribed operating conditions, a substantially uniform plasma condition in a medium with a conductivity level sufficient to ensure significant magnetohydrodynamic action over an interaction length of practical dimension, the nozzle portion of the device containing short-circuited electrodes that feedback the electric current produced in the nozzle and further enhance the electrical conductivity of the gas.

The present invention is characterized by the absence of special electrodes to provide auxiliary ionization in the nozzle region that rapidly expands the working medium. Accordingly, there is no auxiliary power source for energizing an auxiliary ionization means. Further, the electrodes that are provided in the nozzle region of the device can be short circuited to further enhance internal electrical dissipation throughout the expansion region. These features result in an MHD device which is relatively simple to operate and construct and which operates with improved efficiency and greater plasma uniformity.

The foregoing and other objects, features and advantages of the present invention will become more apparent in the light of the following detailed description of preferred embodiment thereof as illustrated in the accompanying drawing.

DESCRIPTION OF THE PREFERRED EMBODIMENT

Figure 1:
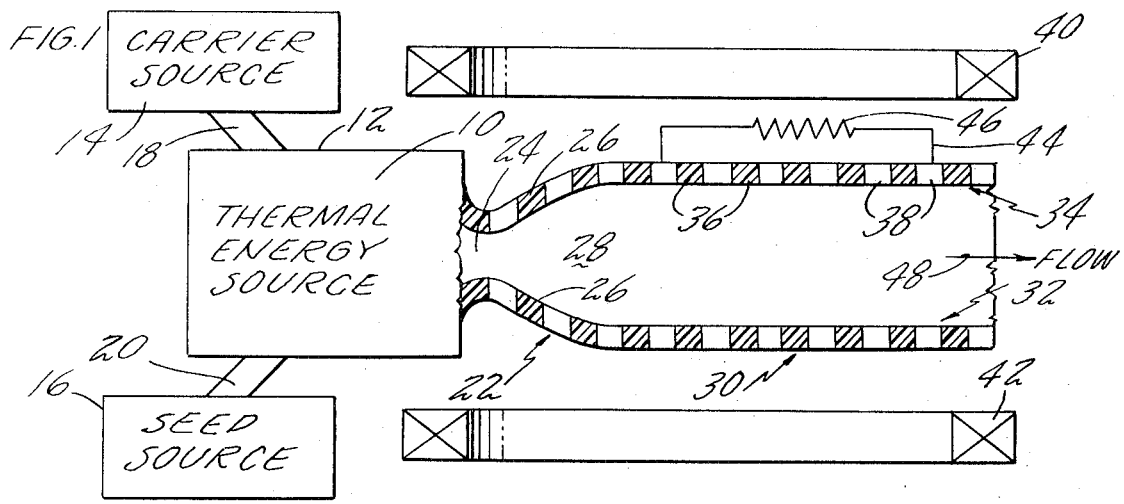
FIG. 1 is a simplified schematic diagram of a nonequilibrium magnetohydrodynamic device in accordance with the present invention.

A device which converts kinetic energy to electrical energy by MHD phenomena and requires no external power source for auxiliary ionization of the working fluid, in accordance with the present invention, is described herein. Energy is supplied to the system shown schematically in FIG. 1 from a source 10 of thermal energy which is contained in a vessel 12 that is capable of withstanding high internal pressures. A working fluid source 14 and a seed source 16 are connected to the high pressure vessel by suitable connecting means 18 and 20, respectively. The pressure vessel 12 is connected to an aerodynamic nozzle 22 which is capable of expanding gas from a condition of high temperature, high pressure and subsonic velocity to a condition of relatively low temperature, low pressure and supersonic velocity over a very short displacement distance. The nozzle has a throat region 24 and electrodes 26, the electrodes being short circuited between one another, and a nozzle exit plane region 28. Downstream of the nozzle is a generator section 30 which comprises a duct-like flow channel having segmented walls 32, 34. The walls are made up of an electrical insulator material 36 and an electrical conductor material 38, these materials being alternately spaced as shown in FIG. 1. A pair of magnetic field coils 40, 42 span the entire region which is comprised of the nozzle 22 and the generator section 30. Suitable electrical connecting means 44 connect the electrodes 38 of the generator to the load resistance 46. A working medium which is comprised of materials from the carrier source and the seed source, is formed in the high pressure vessel 12 and flows in a direction indicated by arrow 48.

As is known in the art, a magnetohydrodynamic device can provide energy in the form of electrical power from the enthalpy contained in a high velocity fluid through the interaction of the moving fluid with a stationary magnetic field; the working fluid is supplied the necessary enthalpy from a thermal source and the required velocity is produced by expanding the fluid across a specially designed aerodynamic nozzle. Operation of the device shown in FIG. 1 involves the heating of a carrier fluid, usually a gas such as helium or another of the noble gases, with an energy source; for the purpose of this invention the nature of the energy source is not relevant. A seed material is added to the carrier material to form a working fluid mixture, the seed being admixed generally after the carrier material has been heated. The seed can be any substance which becomes substantially ionized at the temperature of the carrier material when mixed therewith and as a practical matter is generally an alkali metal, preferably cesium because of its low ionization potential. When the working fluid which is at a relatively high temperature and pressure is expanded across the nozzle, a high velocity stream having a relatively low static pressure and temperature is formed. Since a magnetic field exists in the nozzle region transverse to the direction of flow, and since the working fluid contains some ionized seed material, a current is caused to flow in the plasma contained within the nozzle region due to the well known $\overline{V}$ (velocity of the working fluid) cross $\overline{B}$ (magnetic field) magnetohydrodynamic concept. The electrodes along the walls of the nozzle are exposed to this flow of electric current and since the electrodes are short circuited between one another in the nozzle region, a current path is produced in the circuit formed by the partially ionized gas or plasma passing through the nozzle and the electrodes forming the nozzle walls. The flow of this current further ionizes by internal dissipation the working fluid passing through the nozzle and the $\overline{V}$ cross $\overline{B}$ effect is thereby enhanced in a bootstrap manner, thus increasing even further the ionization of the working fluid and in turn the conductivity thereof as the fluid progresses through the nozzle. Upon reaching the generator section of the device, the working fluid is highly ionized and can therefore interact with the magnetic field which is present throughout the generator section of the device to cause a substantial $\overline{V}$ cross $\overline{B}$ effect and produce a substantial amount of electrical power; the power can be collectible by the electrodes that are positioned along the walls of the generator section and utilized. The working fluid emerges from the generator section and is generally passed through a diffuser in order to match its pressure to the region to which the device is exhausting.

As a practical matter, nonequilibrium MHD generators are limited to lengths of a few meters and to flow velocities in the range of 2,000–4,000 meters per second because of wall friction losses and other undesirable aerodynamic phenomena. These conditions limit the residence time of the working fluid in the generator section to a maximum of about $10^{-4}$–$10^{-3}$ seconds. Therefore, implementation of the self-induced ionization concept described above requires a specific combination of conditions such that the characteristic time for the ionization of a particle of seed material, $T_{ion}$, is significantly shorter than the time for a particle of seed material to pass entirely through both the expansion nozzle and the generator section of the device, $T_{res}$, i.e., $$T_{ion} \ll T_{res}.$$

In addition, conditions must favor the maintenance of a charged particle (seed material) recombination time, $T_{recomb}$, at a level well above $T_{res}$, $$T_{recomb} < T_{res}$$

so that the initial ionization characteristic of the thermal source is not substantially reduced during expansion. Operation of an MHD system according to the present invention requires that $$T_{ion} \ll T_{res} < T_{recomb}.$$

Figure 2:
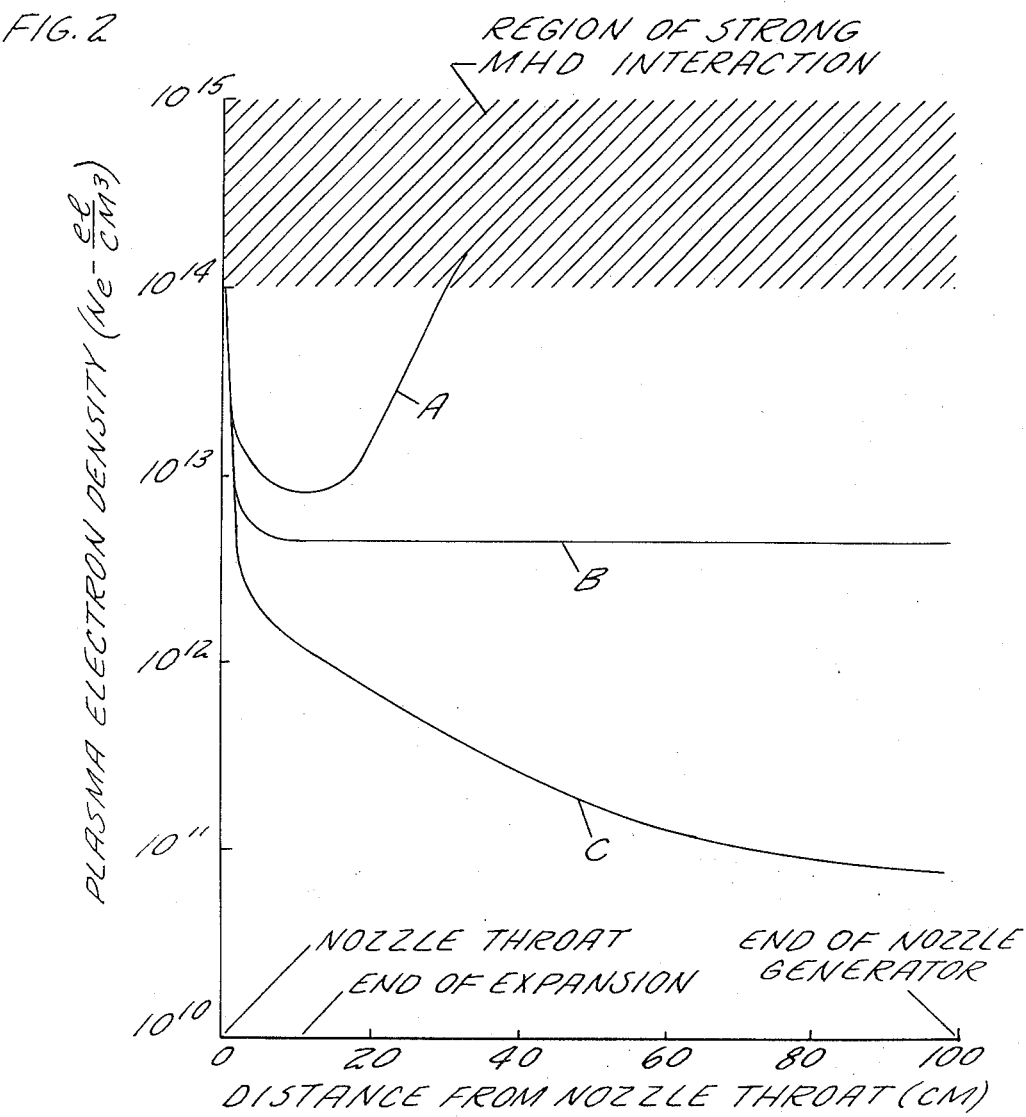
FIG. 2 is a typical graph of the electron density variation as a function of distance along the flow axis of the device shown in FIG. 1 for various plasma conditions.

With cesium as the alkali seed, the condition $$T_{ion} \ll T_{res}$$

requires elevation of the plasma electron temperature, $T_e$, to at least approximately 2,750°K early in the expansion. Since the ionization rate is an extremely strong function of the electron temperature, it has been found that $T_{ion}$ will be greater than $T_{res}$ if the electron temperature level falls by as little as 250°K to 2,500°K. Furthermore, if during the expansion, the electron temperature should fall below approximately 1,000°K, the recombination time becomes short in relation to the fluid residence time and causes a corresponding decline in the electron density and the electrical conductivity. FIG. 2 illustrates the effect on plasma electron density (and therefore electrical conductivity) for various relationships of $T_{res}$, $T_{ion}$, and $T_{recomb}$; curve A is representative of an electron temperature greater than 2,750°K, curve B is representative of an electron temperature in the range of 1,250°–2,750°K and curve C is representative of an electron temperature less than 1,250°K. Since a plasma electron density in the range of $10^{14}$–$10^{15}$ per cubic centimeter is necessary to produce a strong MHD interaction, a minimum plasma electron temperature in the main portion of the generator of approximately 2,750°K is required in the light of the characteristic times for the competing processes.

Implementation of the self-induced ionization phenomena illustrated by curve (A) of FIG. 2 requires judicious adjustment of the flow velocity, magnetic field intensity, and static pressure, combined with a geometry which substantially eliminates the recombination region between the expansion region and the MHD generator working section. For example, the gas mixture which for FIG. 2 was about 99.9 percent helium (by number density) and 0.1 percent cesium appears to be about optimum for nonequilibrium MHD power generation. Elevation of $T_e$ to the 2,750°K curve for this situation requires the condition $$U^2 \beta \gtrsim 3 \times 10^7 \text{ (meters/second)}^2$$

where $U$ is the working fluid velocity (meters/second) after expansion, and $\beta$ is the Hall parameter (dimensionless) after expansion.

The well known Hall parameter is proportional to the magnetic field strength and inversely proportional to the expansion nozzle pressure ratio. Maintaining the magnetic field at full strength throughout the entire generator section and nozzle up to at least the throat of the nozzle, as is illustrated in FIG. 1, is of critical importance to the present invention. This permits the MHD interaction to commence very close to the nozzle throat and facilitates maintaining the electron temperature in the plasma in excess of 1,000°K in the early stages of the expansion, a condition at which ionized cesium recombination time exceeds the flow expansion residence time, i.e., $T_{recomb}$ is greater than $T_{res}$, and also maintaining the electron temperature greater than 2,750°K in the later stages of the expansion, a condition at which $T_{ion}$ is less than $T_{res}$. With these considerations, the constraints on magnetic field, flow speed, power and geometry become readily determinable. Significantly, the above-described combination of conditions is entirely within existing technology and has been achieved. Self-generated MHD action has been observed and electron densities have been measured in the range of $10^{14}$–$10^{15}$ per cubic centimeters and values of electron temperature beyond 2,750°K have been measured with a cesium seed, thus verifying the theoretical prediction of plasma conditions leading a thermally ignited generator.

Although the invention has been shown and described with respect to a preferred embodiment thereof, it should be understood by those skilled in the art that changes and omissions in the form and detail thereof can be made therein without departing from the spirit and the scope of the invention.

Having thus described a typical embodiment of our invention, that which we claim as new and desire to secure by Letters Patent of the United States is:

1. In a nonequilibrium magnetohydrodynamic apparatus the method of converting thermal energy to electrical energy including the steps of:

providing a source of thermal energy;

flowing a carrier fluid to the thermal source to heat the carrier fluid to an elevated temperature;

admixing a seed material which readily ionizes at the elevated temperature, with the carrier fluid to form an electrically uniform, working mixture containing thermally produced, initial ionization, conduction electrons;

flowing the working mixture containing the thermally induced conduction electrons through an aerodynamic nozzle section to rapidly increase the velocity of the mixture, the nozzle having a magnetic field which is substantially transverse to the direction of flow of the mixture and which extends upstream to substantially the throat of the nozzle, the thermal electrons interacting with the magnetic field to produce electric current which is essentially orthogonal to both the magnetic field and the direction of flow of the mixture, the current creating in the characteristic time interval $T_{ion}$ additional ionization of the seed material in the mixture which in turn enhances the amount of the electric current in the manner of a bootstrap cycle;

flowing the increased velocity mixture through a magnetohydrodynamic generator section having an electric power producing magnetic field transverse to the direction of flow to allow an interaction between the magnetic field and the mixture to generate additional electric current across the mixture, the characteristic residence time $T_{res}$ which particles take to pass through the nozzle and generator sections being less than the characteristic recombination time $T_{recomb}$ which the ionized seed particles take to reform into unionized particles, and the characteristic $T_{ion}$ being much less than the characteristic $T_{recomb}$; and exhausting the mixture to an ambient pressure condition.

2. The method according to claim 1 wherein the conduction electrons in the working mixture which is passing through the generator section are at an average temperature of at least about 2,750°K.

3. The method according to claim 2 wherein the additional conduction electrons produced in flowing the conductive mixture through the nozzle having an ionization magnetic field transverse to the flow provides an electron density in the conductive mixture of at least about $10^{14}$ per cubic centimeter.

4. The method according to claim 1 wherein the average temperature of the conduction electrons contained in the working fluid passing through the aerodynamic nozzle is maintained above approximately 1,250°K.

* * * * *

PO-1050
(5/69)

UNITED STATES PATENT OFFICE
CERTIFICATE OF CORRECTION

Patent No. 3,811,057                    Dated May 14, 1974

Inventor(s)  ROBERT T. BROWN ET AL

It is certified that error appears in the above-identified patent and that said Letters Patent are hereby corrected as shown below:

Attorney's name          "Anthony J. Crisco" should read
                         -- Anthony J. Criso --

Column 2, line 59        "throught" should read -- thought --

Column 5, line 24        "$T_{recomb} < T_{res}$" should read
                         -- $T_{recomb} > T_{res}$ --

Signed and sealed this 10th day of September 1974.

(SEAL)
Attest:

McCOY M. GIBSON, JR.                          C. MARSHALL DANN
Attesting Officer                             Commissioner of Patents